B. ULFERTS.
LUBRICATING MECHANISM FOR CRANK PINS.
APPLICATION FILED JAN. 11, 1916.
1,288,765.
Patented Dec. 24, 1918.
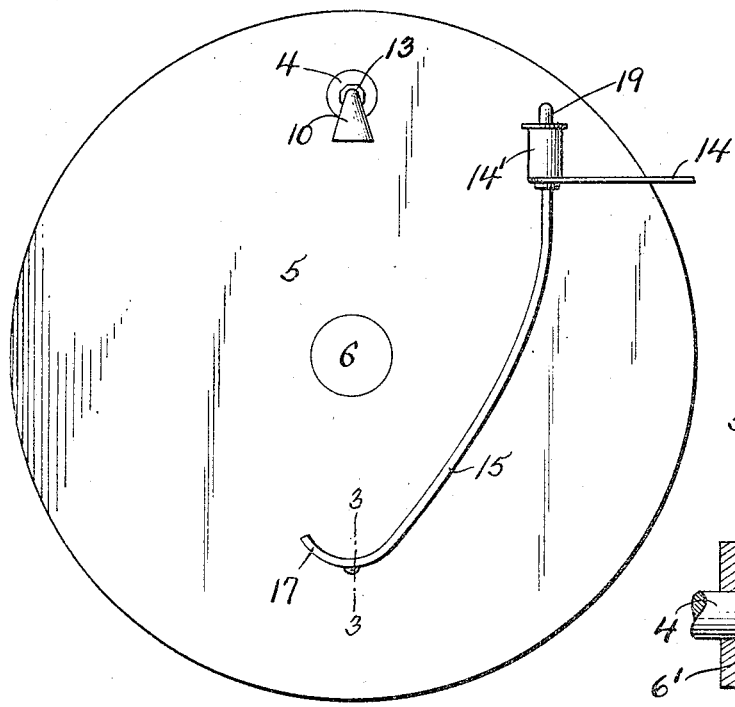
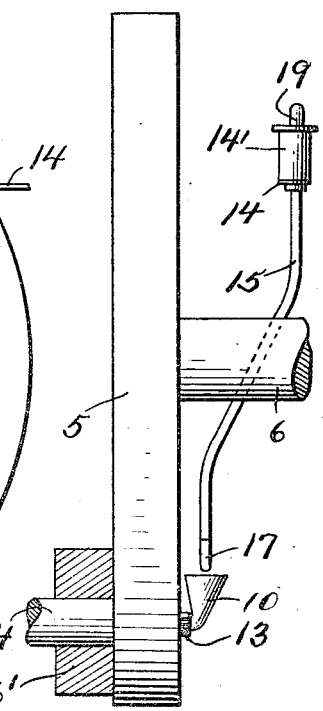
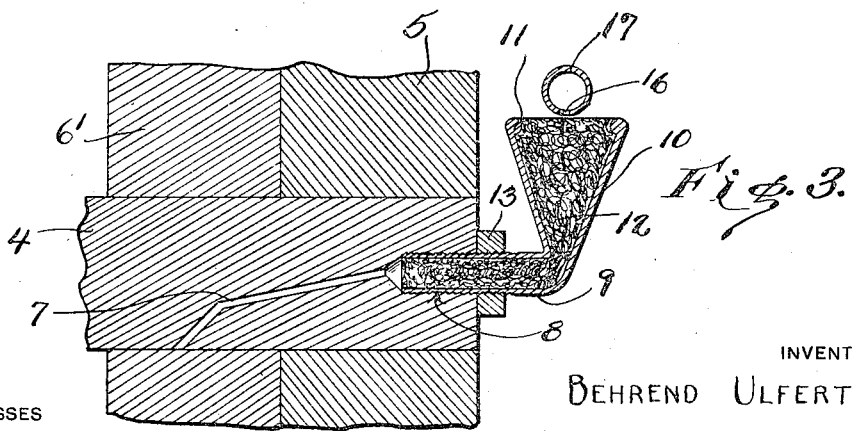
INVENTOR
BEHREND ULFERTS
ATTORNEY

UNITED STATES PATENT OFFICE.

BEHREND ULFERTS, OF LAKEFIELD, MINNESOTA.

LUBRICATING MECHANISM FOR CRANK-PINS.

1,288,765.        Specification of Letters Patent.     Patented Dec. 24, 1918.

Application filed January 11, 1916. Serial No. 71,559.

*To all whom it may concern:*

Be it known that I, BEHREND ULFERTS, a citizen of the United States, residing at Lakefield, in the county of Jackson and State of Minnesota, have invented certain new and useful Improvements in Lubricating Mechanism for Crank-Pins, of which the following is a specification.

My invention relates to lubricating mechanisms particularly adapted for use in connection with crank pins or parts mounted off-center and necessitating lubrication.

The prime object is to provide a novel and efficient lubricating means having a device which is movable with a machine part to periodically supply a quantity of lubricant to a desired location.

Another important object is to provide means always open to the supply of lubricant which is capable of inversion without loss of its contents.

A further important object is to provide a mechanism having a lubricant supplying means and lubricant receiving means, with the receiving means movable with a machine element, the supplying means being adapted to feed the lubricant periodically when the receiving means comes into wiping contact therewith and the receiving means being of such construction as to retain the supplied lubricant even when inverted.

With the above, and additional objects such as will hereinafter appear from the description following taken in connection with the accompanying drawings, wherein one preferred construction is shown, in view, Figure 1 is an elevational view of my improvement applied to rotary machine elements;

Fig. 2 is a view of the part of Fig. 1 taken at right angles thereto, being partly broken away and shown in section, and Fig. 3 is an enlarged detail sectional view taken on the line 3—3 of Fig. 1.

Referring specifically to the drawings, wherein like reference characters designate like or similar parts, 4 designates a crank pin which is rigidly connected to a rotary wheel or machine element 5 mounted on a shaft 6. The crank or eccentric pin 4 travels with the element 5 and has pivoted thereon at the rear of element 5, a pitman or the like 6'.

The above parts are to be taken as conventional for the purpose of illustrating the application of my improved lubricating mechanism. The invention is capable of use in connection with center crank shafts of gas engines, crank pins, and as a matter of fact in connection with crank or eccentrically disposed pins or the equivalent generally.

In the pin 4, a groove or supply passageway 7 is provided which opens at the periphery of the crank pin opposite the pitman 6' so as to lubricate the pitman and crank pin at their bearing. Groove 7 opens into a bore 8 enlarged diametrically with respect to the groove and being provided with interior screw threads with which engage screw threads on the exterior of a tube 9. The tube 9 forms part of a lubricant receptacle which is completed by a funnel 10 having its axis at an angle to the tube 9 and having its inner wall inwardly enlarged to provide a retaining bead 11 for absorbent material like raw cotton which is shown at 12. A lock nut 13 may ride on the threads of the tube 9 in order to abut the outer end of the crank pin 4 and serve as a lock nut.

Fastened to any suitable stationary structure, as by means of a bar 14, is a suitable lubricant supply means which may consist of a reservoir 14' and a feed tube 15. The outer extremity of the tube 15 is preferably arcuate with an opening 16 at its base to retain the oil thereat at such tension that it may be wiped therefrom at a drop each time. The reservoir 14' may have any suitable form of removable cap at its equivalent 19 to permit filling.

In operation as wheel or element 5 is rotated or turned through the medium of shaft 6, the lubricant receiving means travels therewith and once during each revolution the raw cotton 12 wipes a drop of oil from the tube 15 at opening 16. It will further be noted that at times the receiving element 10 must be inverted. Owing to the fact that the absorbent material is provided, it will absorb the lubricant through capillarity and prevent its loss. It may be mentioned that the bead 11 serves to retain the absorbent material within the receiver 10. When the supply of absorbed lubricant becomes sufficient, the same flows from the absorbent material through the groove 7 and intermediate the periphery of the pin and bearing portion of the pitman 6 journaled thereon in order to lubricate the parts at this point.

Attention is called to the fact that the arcuate portion 17 serves to enable the receiving means to better wipe the portion 17.

Since merely the preferred embodiment has been illustrated and described, it is to be understood that changes in the details of construction may be resorted to within the spirit and scope of the appended claims.

I claim:

1. A device for lubricating crank pins or the like comprising a crank pin provided at one end with a threaded axial bore which extends inwardly for a short distance and merges into a duct which extends substantially longitudinally for the greater part of its length and then bends sharply to terminate at the periphery of the crank pin, an externally threaded tube engaging the threads of said bore, a funnel-shaped oil receiving receptacle formed integral with said tube and having its axis at right angles to the axis of said tube and its open end disposed toward the axis of revolution of the crank pin and provided on the inner edge of said open end with a circumferential bead whereby the absorbent material adapted to be contained within the receptacle to receive the lubricant and deliver it to the duct and thence to the periphery of the crank pin is effectively retained therein, a lock nut riding upon the external threads of the tube and adapted to abut the end of the crank pin for securely maintaining the proper relation of the different parts, and lubricant supplying means mounted in fixed and coöperative relation to the oil receiving receptacle, said means comprising a reservoir, a tube connected with said reservoir having an arcuate portion provided at its lowermost point with an outlet, said arcuate portion being adapted to wiping contact with the absorbent material of the lubricant receiving receptacle whereby lubricant is automatically and periodically delivered thereto.

2. A device for lubricating crank pins or the like comprising a crank pin provided at one end with a threaded axial bore merging into a duct which terminates at the periphery of the crank pin, a threaded tube engaging the threads of the said bore, a funnel-shaped lubricant receiving receptacle formed integral with said tube and having its open end disposed toward the axis of revolution of the crank pin whereby the centrifugal force attendant to the revolution of the crank pin is utilized to deliver the lubricant to the periphery thereof and lubricant supplying means mounted in fixed and coöperative relation to the lubricant receiving receptacle whereby lubricant is automatically and periodically delivered thereto.

3. A device for lubricating crank pins or the like comprising a crank pin provided at one end with an axial bore merging into a duct which terminates at the periphery of the crank pin, a lubricant receiving receptacle mounted upon said crank pin and having its open lubricant receiving end disposed toward the axis of revolution of the crank pin whereby the centrifugal force attendant to said revolution is utilized to deliver the lubricant to the periphery thereof and said receptacle is provided with retaining means whereby the absorbent material adapted to be contained within the receptacle for receiving the lubricant and by its capillary action supplementing the action of the centrifugal force, is effectively retained therein and lubricant supplying means mounted in fixed and coöperative relation to the lubricant receiving receptacle whereby lubricant is automatically and periodically delivered thereto.

4. A lubricating device in combination with a rotatable machine element, a lubricant receiving means carried by said element having an entrance opening for the reception of lubricant directed toward the axis of rotation, means within the receptacle for gathering the lubricant, a container for a lubricant out of the path of the receiving means, conveying means carried by the lubricant container and means at the end of said conveying means for holding the lubricant as conveyed in the path of the receiving means.

5. In combination with a turnable machine element, a crank pin movable therewith and a machine element journaled on said crank pin, said crank pin being provided with a groove extending substantially longitudinally and opening at its periphery and opposite the second mentioned machine element, lubricant receiving means having a tube, said tube being screw threaded into said crank pin and communicating with said groove, a lock nut on the exterior of said tube engageable with the end of the crank pin, a funnel leading to the tube, absorbent means within the funnel, retaining means on the funnel for said absorbent means, lubricant supplying means for the first mentioned machine element, and said supplying means having a portion to be wiped by the receiving means.

6. A lubricating device in combination with a rotatable machine element, a cone shaped lubricant receiving cup carried by said element, a bead formed around the entrance to the cup for retaining a lubricant collector, said entrance to the cup being directed toward the axis of rotation, a container for a lubricant out of the path of the cup, a tube for conveying the lubricant and an arcuate extension to the tube for suspending the lubricant in the path of the receiving cup.

In testimony whereof I affix my signature in presence of two witnesses.

BEHREND ULFERTS.

Witnesses:
   EMIL C. ANDERSEN,
   J. F. SLETZ.

Copies of this patent may be obtained for five cents each, by addressing the "Commissioner of Patents, Washington, D. C."